US011580466B2

(12) United States Patent
Mahapatra et al.

(10) Patent No.: US 11,580,466 B2
(45) Date of Patent: Feb. 14, 2023

(54) UTILIZING MACHINE LEARNING MODELS TO AGGREGATE APPLICATIONS AND USERS WITH EVENTS ASSOCIATED WITH THE APPLICATIONS

(71) Applicant: Accenture Global Solutions Limited, Dublin (IE)

(72) Inventors: Amaresh Mahapatra, Bangalore (IN); Balaji Chandrashekar, Bangalore (IN); Ruth Shanthini, Bengaluru (IN); Satish Kumar, Bengaluru (IN); Sujit Ganguly, Bangalore (IN); Suresh Kumar Ramaswamy, Bangalore (IN)

(73) Assignee: Accenture Global Solutions Limited, Dublin (IE)

( * ) Notice: Subject to any disclaimer, the term of this patent is extended or adjusted under 35 U.S.C. 154(b) by 190 days.

(21) Appl. No.: 17/003,463

(22) Filed: Aug. 26, 2020

(65) Prior Publication Data
US 2022/0067604 A1     Mar. 3, 2022

(51) Int. Cl.
*G06Q 10/06* (2012.01)
*G06N 20/00* (2019.01)
*G06K 9/62* (2022.01)
*H04L 67/306* (2022.01)
*G06Q 10/0631* (2023.01)

(52) U.S. Cl.
CPC ....... *G06Q 10/06311* (2013.01); *G06K 9/623* (2013.01); *G06K 9/6215* (2013.01); *G06N 20/00* (2019.01); *H04L 67/306* (2013.01)

(58) Field of Classification Search
None
See application file for complete search history.

(56) References Cited

U.S. PATENT DOCUMENTS

| 10,326,748 | B1 * | 6/2019 | Brisebois | H04L 63/08 |
|---|---|---|---|---|
| 2020/0125586 | A1 * | 4/2020 | Rezaeian | G06N 7/005 |
| 2021/0014260 | A1 * | 1/2021 | Singh | H04L 41/0253 |
| 2021/0014327 | A1 * | 1/2021 | Boss | H04W 4/029 |
| 2021/0092161 | A1 * | 3/2021 | Crabtree | G06F 16/2477 |

OTHER PUBLICATIONS

J. An, H. Kwak and B. J. Jansen, "Personas for Content Creators via Decomposed Aggregate Audience Statistics," 2017 IEEE/ACM International Conference on Advances in Social Networks Analysis and Mining (ASONAM), 2017, pp. 632-635. (Year: 2017).*

* cited by examiner

*Primary Examiner* — Chesiree A Walton
(74) *Attorney, Agent, or Firm* — Harrity & Harrity, LLP

(57) ABSTRACT

A device may receive data that identifies applications utilized by users, databases utilized by the applications, and the users, and may process the received data, with first models, to determine context data that matches the users and events associated with the applications, and task data that identifies tasks to be performed by the users in response to the events. The device may process the received data and the context data, with a second model, to generate role data that identifies user interfaces utilized by the users to access the applications, and credentials of the users, and may process the context data, the task data, and the role data, with a third model, to generate persona data that identifies personas, and assignment data that assigns each of the users to one of the personas. The device may perform actions based on the persona data and the assignment data.

20 Claims, 9 Drawing Sheets

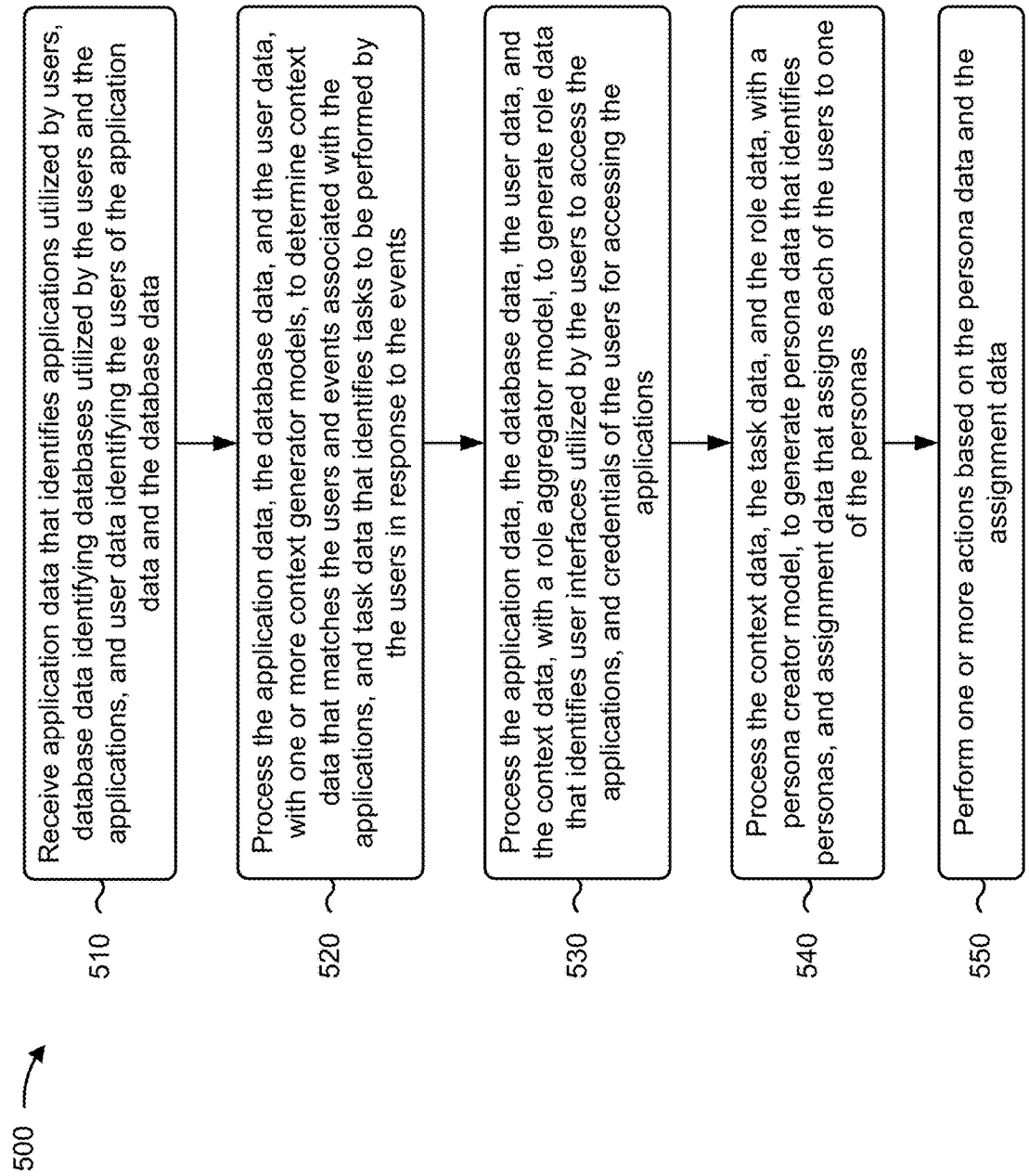

UTILIZING MACHINE LEARNING MODELS TO AGGREGATE APPLICATIONS AND USERS WITH EVENTS ASSOCIATED WITH THE APPLICATIONS

BACKGROUND

A cloud computing environment is a model of computing where servers, networks, storage, development tools, and applications are enabled through a network (e.g., the Internet). Managing cloud computing environments and/or legacy computing environments may require multiple applications. Such applications may operate as standalone services, may not conform to any standards, and may include unique user experiences, data models, authentication requirements, and target audiences. This results in excessive manual effort by personnel (e.g., technicians, software managers, and/or the like), excessive switching between applications (e.g., often requiring new credentials), a dissatisfying user experience, and an inability to determine accurate and complete reporting and management.

SUMMARY

In some implementations, a method includes receiving application data that identifies applications utilized by users, database data that identifies databases utilized by the users and the applications, and user data that identifies the users of the application data and the database data, and processing the application data, the database data, and the user data, with one or more context generator models, to determine context data that matches the users and events associated with the applications, and task data that identifies tasks to be performed by the users in response to the events. The method may include processing the application data, the database data, the user data, and the context data, with a role aggregator model, to generate role data that identifies user interfaces utilized by the users to access the applications, and credentials of the users for accessing the applications, and processing the context data, the task data, and the role data, with a persona creator model, to generate persona data that identifies personas, and assignment data that assigns each of the users to one of the personas. The method may include performing one or more actions based on the persona data and the assignment data.

In some implementations, a device includes one or more memories, and one or more processors to receive application data identifying applications utilized by users, database data identifying databases utilized by the users and the applications, and user data identifying the users of the application data and the database data, and process the application data, the database data, and the user data, with one or more context generator models, to determine context data matching the users and events associated with the applications, and task data identifying tasks to be performed in response to the events. The one or more processors may process the application data, the database data, the user data, and the context data, with a role aggregator model, to generate role data identifying user interfaces utilized by the users to access the applications, and credentials of the users for accessing the applications, and may process the context data, the task data, and the role data, with a persona creator model, to generate persona data identifying personas, and assignment data assigning each of the users to one of the personas. The one or more processors may receive a new event associated with one of the applications, and may assign the new event to one of the personas based on the persona data and one of the users based on the assignment data.

In some implementations, a non-transitory computer-readable medium may store a set of instructions that include one or more instructions that, when executed by one or more processors of a device, cause the device to receive application data identifying applications utilized by users, database data identifying databases utilized by the users and the applications, and user data identifying the users of the application data and the database data, and process the application data, the database data, and the user data, with one or more first models, to determine context data matching the users and events associated with the applications, and task data identifying tasks to be performed in response to the events. The one or more instructions may cause the device to process the application data, the database data, the user data, and the context data, with a second model, to generate role data identifying user interfaces utilized by the users to access the applications, and credentials of the users for accessing the applications, and process the context data, the task data, and the role data, with a third model, to generate persona data identifying personas, and assignment data assigning each of the users to one of the personas. The one or more instructions may cause the device to perform one or more actions based on the persona data and the assignment data.

BRIEF DESCRIPTION OF THE DRAWINGS

FIG. 5 is a flow chart of an example process for utilizing machine learning models to aggregate applications and users with events associated with the applications.

DETAILED DESCRIPTION

Figure 1A:
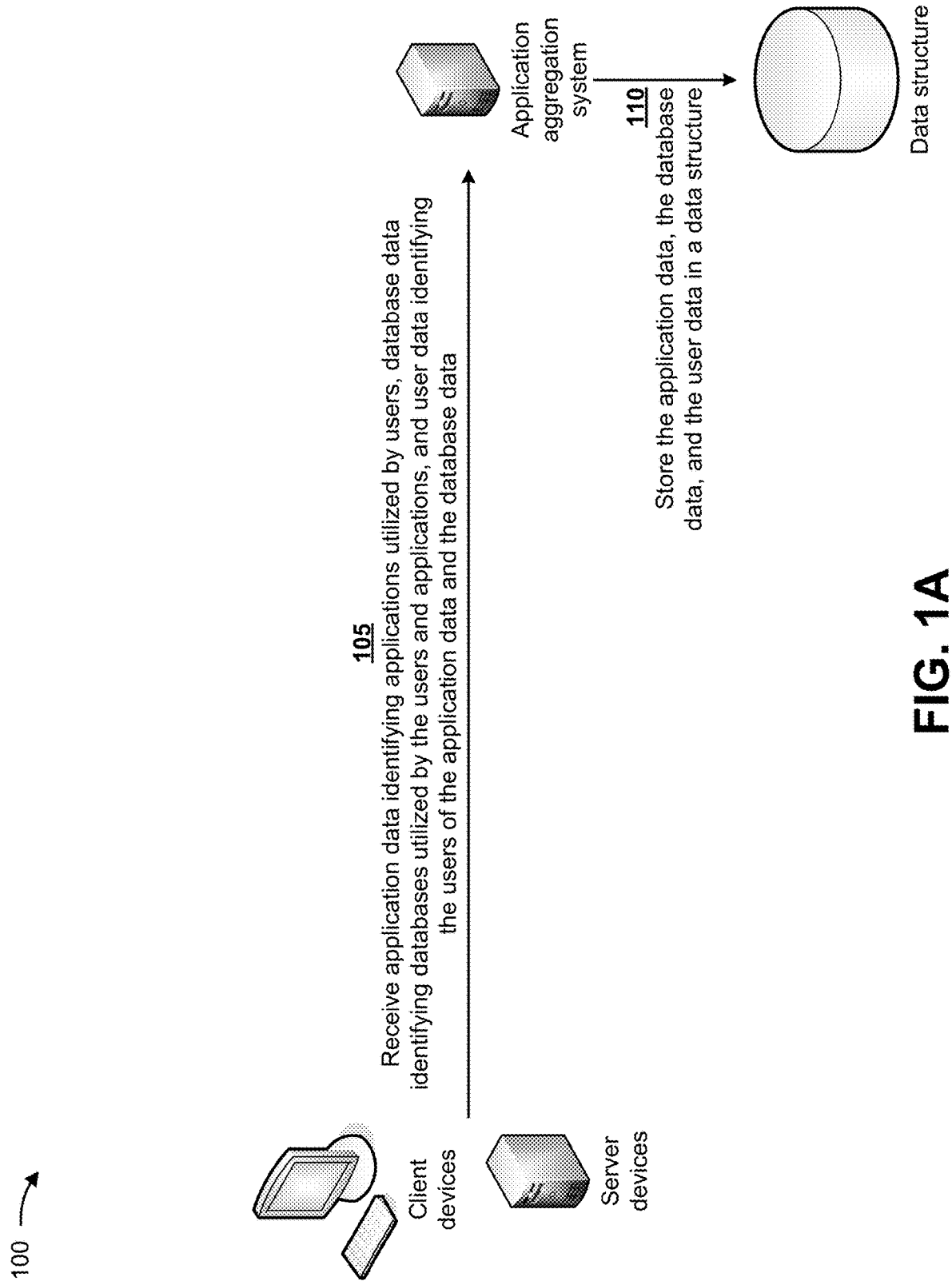
FIGS. 1A-1E are diagrams of an example implementation described herein.

The following detailed description of example implementations refers to the accompanying drawings. The same reference numbers in different drawings may identify the same or similar elements.

Current techniques to manage cloud computing environments and/or legacy computing environments require different applications with different credential requirements and different data formats to describe events associated with the applications. The different applications may be standalone applications and may require frequent switching to other standalone applications. This creates significant learning requirements for users, increases a risk of missing important information, and creates significant delays associated with switching and logging in to different applications. Little or no common context may exist between the different applications and users may not be able to duplicate information or tasks without such context, which reduces productivity of the users. Furthermore, current techniques to manage cloud computing environments and/or legacy computing environments require users to utilize a large quantity (e.g., ten, fifteen, and/or the like) of different applications with different user interfaces, making user performance of tasks productively quite challenging. This may lead to excessive use of computing resources (e.g., processing resources, memory resources, communication resources, and/or the like), networking resources, and/or the like to access different applications, switch between different applications, learn about different applications, manage cloud computing environments and/or legacy computing environments, and/or the like.

Some implementations described herein provide an application aggregation system that utilizes machine learning models to aggregate applications and users with events associated with the applications. For example, the application aggregation system may receive application data that identifies applications utilized by users, database data that identifies databases utilized by the users and the applications, and user data that identifies the users of the application data and the database data. The application aggregation system may process the application data, the database data, and the user data, with one or more context generator models, to determine context data that matches the users and events associated with the applications, and task data that identifies tasks to be performed by the users in response to the events, and may process the application data, the database data, the user data, and the context data, with a role aggregator model, to generate role data that identifies user interfaces utilized by the users to access the applications, and credentials of the users for accessing the applications. The application aggregation system may process the context data, the task data, and the role data, with a persona creator model, to generate persona data that identifies personas, and assignment data that assigns each of the users to one of the personas, and may perform one or more actions based on the persona data and the assignment data.

In this way, and in contrast to current techniques, the application aggregation system utilizes machine learning models to aggregate applications and users with events associated with the applications. Correspondingly, the application aggregation system conserves computing resources, networking resources, and/or the like that would otherwise have been wasted accessing different applications, switching between different applications, learning about different applications, managing cloud computing environments and/or legacy computing environments, and/or the like. The application aggregation system may also improve overall performance of the cloud computing environments and/or the legacy computing environments due to efficient and effective utilization of the different applications for managing the cloud computing environments and/or the legacy computing environments. Furthermore, the application aggregation system may handle thousands, millions, billions, and/or the like, of data points associated with the different applications within a period of time (e.g., daily, weekly, monthly), and thus may provide "big data" capability.

FIGS. 1A-1E are diagrams of an example 100 associated with utilizing machine learning models to aggregate applications and users with events associated with the applications. As shown in FIG. 1A, one or more client devices and one or more server devices may be associated with an application aggregation system. A client device, of the one or more client devices, may include a communication and/or computing device, such as a mobile phone, a smartphone, a laptop computer, a tablet computer, and/or the like. A server device, of the one or more server devices, may include a communication and/or computing device, such as a server, a web server, a server in a cloud computing environment, and/or the like. The application aggregation system may include a system that utilizes machine learning models to aggregate applications and users with events associated with the applications.

As also shown in FIG. 1A, and by reference number 105, the application aggregation system receives application data identifying applications utilized by users, database data identifying databases utilized by users and applications, and user data identifying the users of the application data and the database data from the one or more client devices and/or the one or more server devices. The application data may include information identifying a name of an application utilized by a user, an application identifier associated with the application, information identifying a device executing the application (e.g., a device identifier, an address associated with the device, and/or the like), and/or the like.

The database data may include information identifying an identifier associated with a database utilized by a user and/or an application, information identifying a device storing the database, information identifying a portion of the database accessed by the user and/or the application (e.g., a field, an entry, a memory location, and/or the like), and/or the like. The user data may include information identifying a username associated with a user accessing an application and/or a database, an identifier associated with the user (e.g., an employee identification number, an email address, and/or the like), information identifying a device utilized by the user to access the application and/or the database, and/or the like.

In some implementations, the application aggregation system may receive the application data, the database data, and/or the user data based on requesting the application data, the database data, and/or the user data from the one or more client devices and/or the one or more server devices. Alternatively, and/or additionally, the application aggregation system may receive the application data, the database data, and/or the user data based on an occurrence of an event. For example, the application aggregation system may receive the application data, the database data, and/or the user data based on a user accessing a service, an application, a database, and/or the like associated with the application aggregation system.

In some implementations, the application aggregation system may periodically obtain the application data, the database data, and/or the user data. For example, the application aggregation system may obtain the application data, the database data, and/or the user data on a scheduled basis (e.g., every hour, every 3 hours, every day, every week, and/or the like). In some implementations, the application aggregation system may determine the schedule and may obtain the application data, the database data, and/or the user data from the one or more client devices and/or the one or more server devices according to the schedule.

As shown by reference number 110, the application aggregation system stores the application data, the database data, and the user data in a data structure (e.g., a database, a table, a list, and/or the like). The application aggregation system may store the application data, the database data, and/or the user data in one or more data structures based on receiving the application data, the database data, and/or the user data from the one or more client devices and/or the one or more servers. In some implementations, the one or more data structures are maintained in a memory of the application aggregation system. Alternatively, and/or additionally, the one or more data structures may be maintained in a memory of one or more other devices.

Figure 1B:
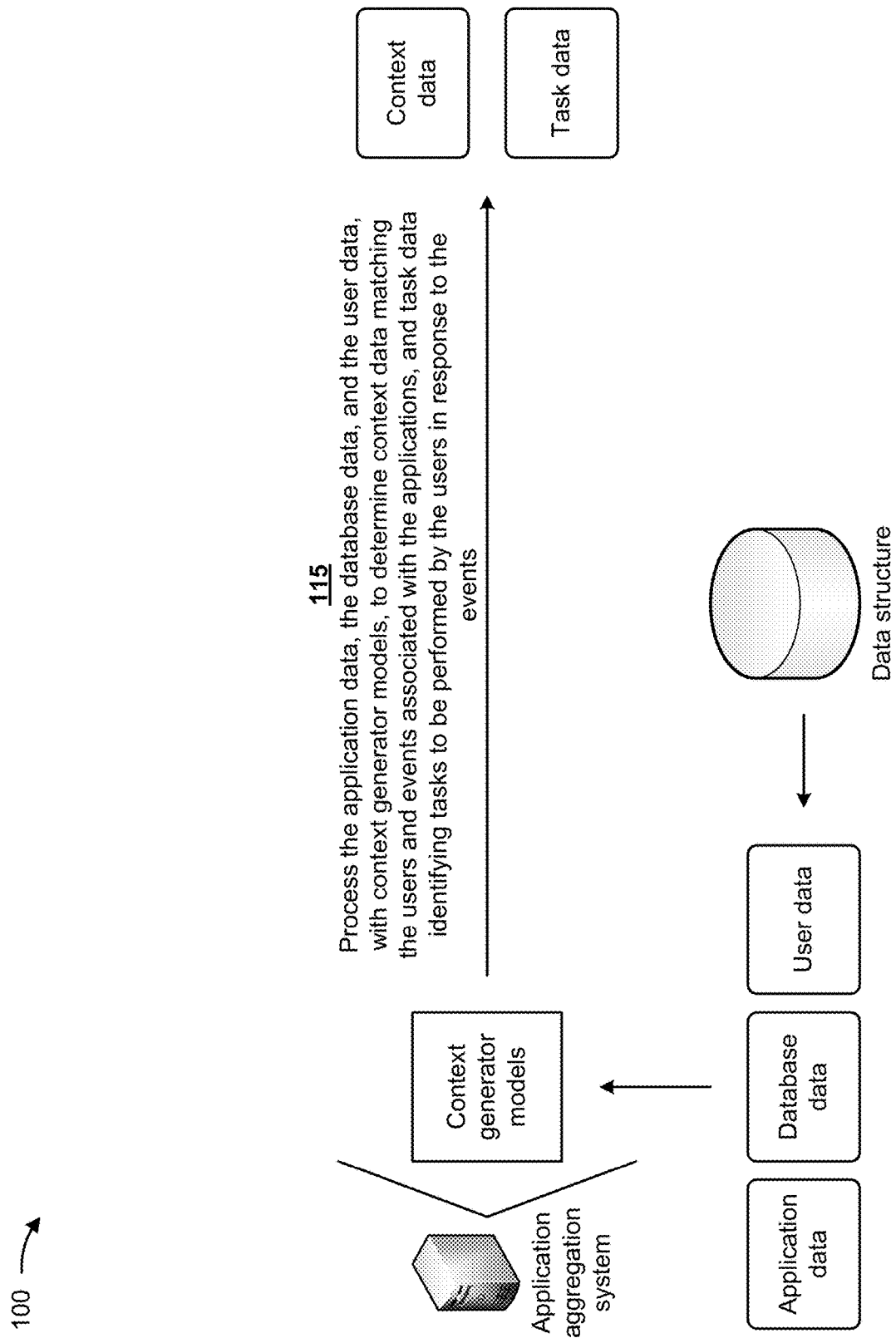

As shown in FIG. 1B, and by reference number 115, the application aggregation system processes the application data, the database data, and the user data, with context generator models, to determine context data matching the users and events associated with the applications and task data identifying tasks to be performed by the users in response to the events. The context data may include information identifying an application utilized by a user to perform one or more actions associated with an event, such as an error event, an administrative event, a maintenance event, and/or the like.

The error event may include an event associated with an occurrence of an error or an issue requiring a corrective action to be taken, such as a service going offline; a user being unable to access a database, a service, and/or the like; and/or the like. The administrative event may include an event associated with a performance of an administrative task, such as creating a user profile for a new employee, modifying a user profile, generating a report, and/or the like. The maintenance event may include an event associated with maintaining a device, an application, a service, and/or the like, such as performing a diagnostic test, backing up stored data, performing a software update, installing a new application, and/or the like.

The context data may include data identifying resources associated with the events (e.g., a device, application, service, and/or the like utilized by a user, computing resources (e.g., processing resources, memory resources, communication resources, and/or the like) associated with the events, and/or the like), a type of the event (e.g., an error event, an administrative event, a maintenance event, and/or the like), criticalities associated with the events (e.g., a service being offline, a large amount of computing resources being utilized, a quantity of devices, applications, services, databases, and/or the like affected by an event, and/or the like), frequencies associated with the events (e.g., hourly, daily, weekly, three times a month, and/or the like), and/or the like.

The application aggregation system may process the application data, the database data, and the user data, with one or more of an a priori model, a support vector model, a naive Bayes model, or a k-means model, to rank the users and match the users with the events based on rankings of the users. The application aggregation system may rank the users based on a quantity of times a user performed an action associated with an event, based on whether the action performed by the user was successful in resolving an issue associated with the event, a position of the user (e.g., a technician, an accountant, a supervisor, and/or the like), and/or the like.

By ranking the users, the application aggregation system may distinguish a user having a duty associated with the event from a user merely performing an action related to an event. As an example, a user may experience an error event when accessing an application. The user may perform one or more actions in an attempt to correct the error event prior to submitting a trouble ticket to notify a technician about the error event. The technician may receive the trouble ticket and may perform an action to correct the error event. The application aggregation system may rank the technician higher than the user based on a quantity of time the technician performed an action associated with an error event, based on the action performed by the technician correcting the error event, based on the position of the technician, and/or the like. The application aggregation system may match the technician with the error event based on ranking the technician higher than the user.

The task data may include information identifying one or more tasks to performed based on the occurrence of an event. The application aggregation system may determine the task data identifying the one or more tasks to be performed based on the occurrence of the event based on prior tasks performed by the users matched with the events. Continuing with the example described above, the application aggregation system may determine the task data based on the technician performing the action to correct the error event.

In some implementations, the context generator models include a fuzzy matching model, a Levenshtein distance model, a Damerau-Levenshtein distance model, a term frequency model, and/or an inverse document frequency model. In some implementations, the application aggregation system may train the context generator models to determine the context data and/or the task data. The context generator models may be trained based on historical data relating to events and historical data relating to classifications with which those events are associated. The context generator models may be trained to determine, based on information regarding an event, context data and task data with which the event is associated, a confidence score that reflects a measure of confidence that the context data and the task data are accurate for this event. In some implementations, the application aggregation system trains the context generator models in a manner similar to that described below with respect to FIG. 2. Alternatively, and/or additionally, the application aggregation system may obtain a trained context generator model from another device.

Figure 1C:
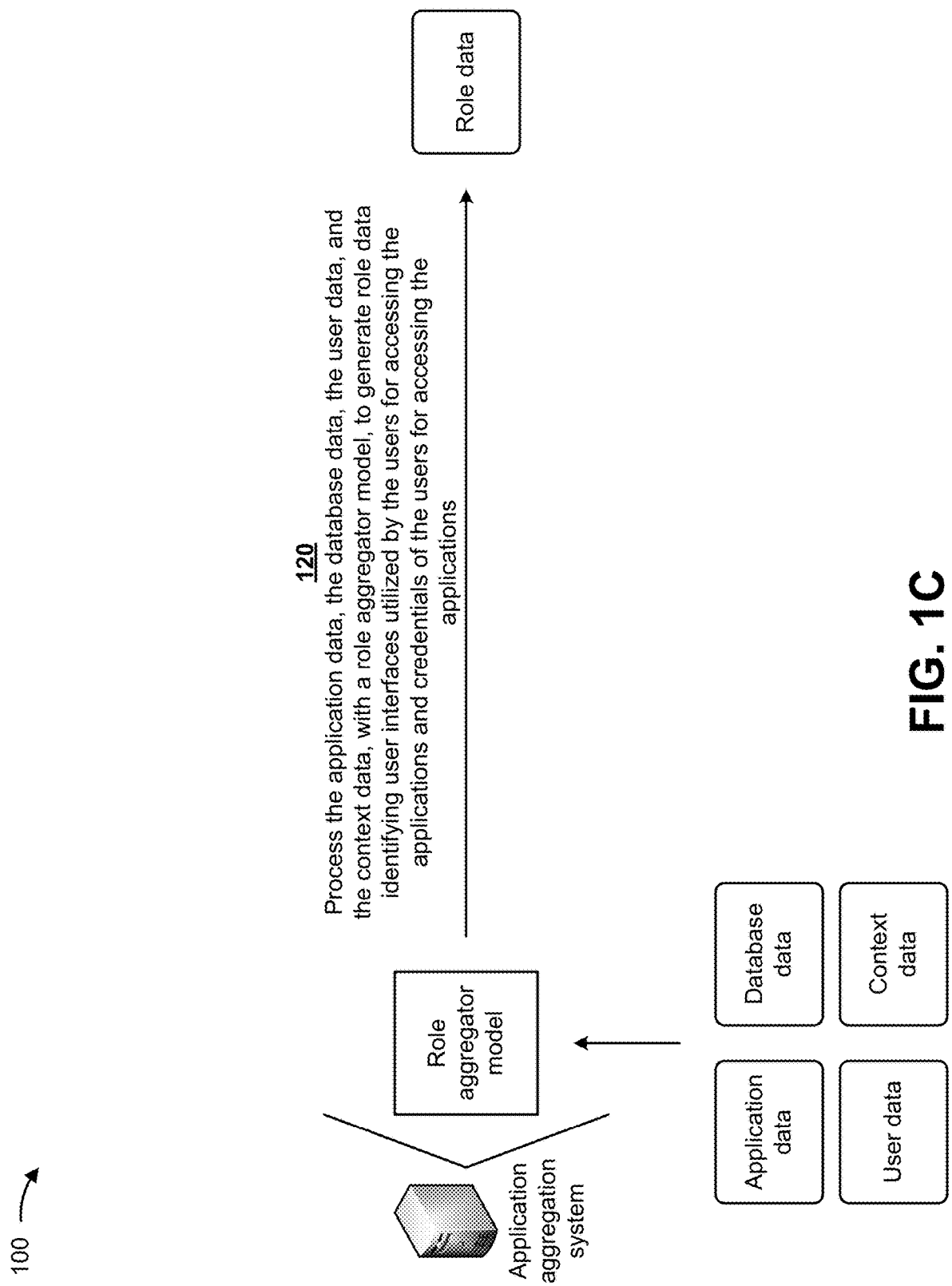

As shown in FIG. 1C, and by reference number 120, the application aggregation system processes the application data, the database data, the user data, and the context data, with a role aggregator model, to generate role data identifying user interfaces utilized by the users for accessing the applications and credentials of the users for accessing the applications.

The application aggregation system may identify an application utilized by a user based on the application data. The application aggregation system may determine a user interface utilized by the user to access the application. For example, the application aggregation system may determine the user interface based on information stored in a data structure mapping applications to user interfaces associated with the applications. The application aggregation system may identify credentials of the user for accessing the application based on the user data. For example, the user data may include information identifying a username and a password utilized by the user to access the application. The application aggregation system may associate the credentials with the user interface based on the user utilizing the credentials to access the application. The application aggregation system may generate role data based on associating the credentials with the user interfaces.

In some implementations, the application aggregation system may train the role aggregator model to determine the role data. The role aggregator model may be trained based on historical data relating to user interface utilized by users for accessing applications and credentials of the users for accessing the applications. The role aggregator model may be trained to determine, based on application data, user data, database data, and context data, role data associated with an event, a confidence score that reflects a measure of confidence that the role data is accurate for this event. In some implementations, the application aggregation system trains the role aggregator model in a manner similar to that described below with respect to FIG. 2. Alternatively, and/or additionally, the application aggregation system may obtain a trained role aggregator model from another device.

Figure 1D:
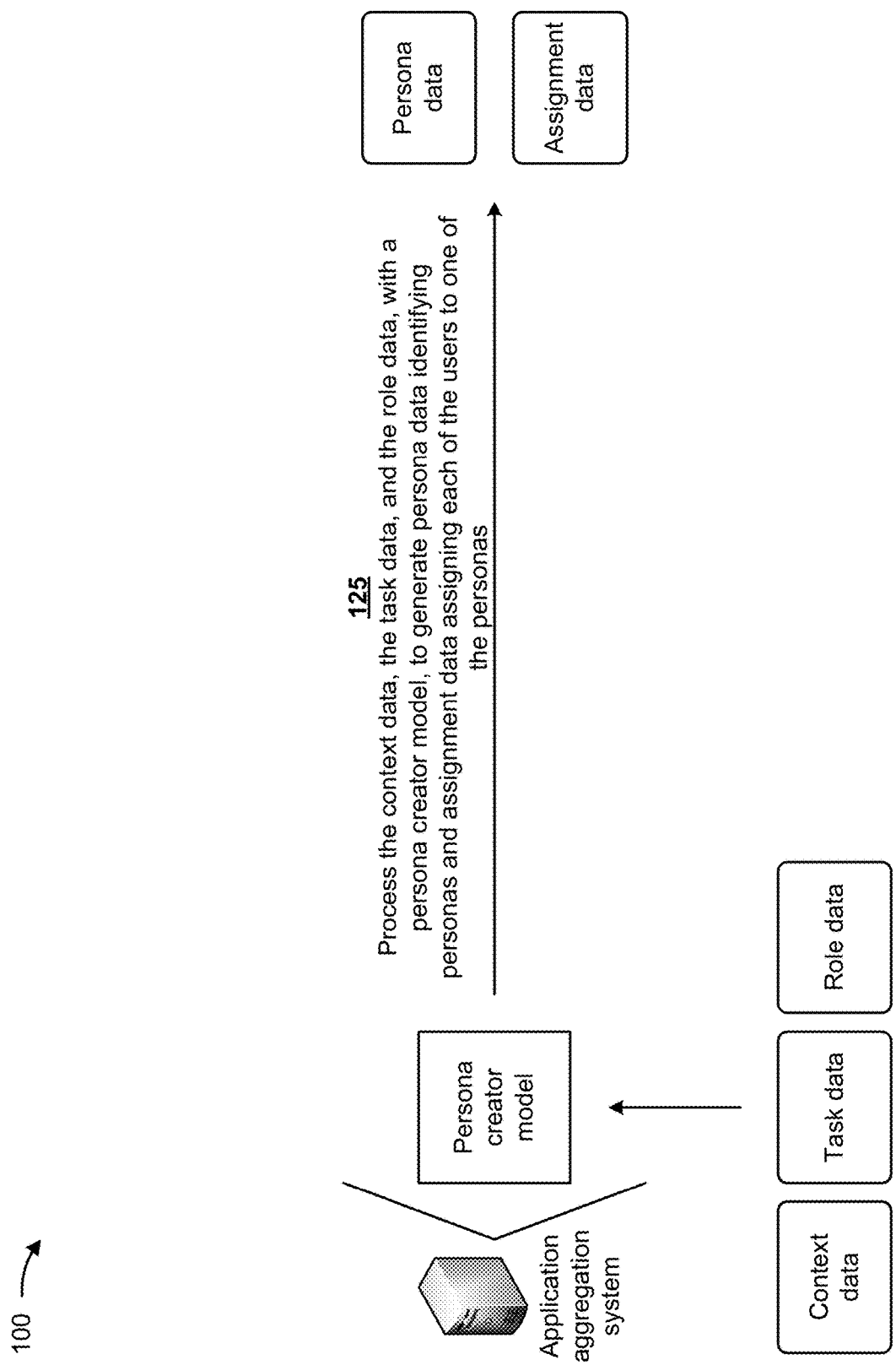

As shown in FIG. 1D, and by reference number 125, the application aggregation system processes the context data, the task data, and the role data, with a persona creator model, to generate persona data identifying personas and assignment data assigning each of the users to one of the personas. The personas may be associated with roles, positions, and/or the like associated with an entity (e.g., a person, a business, an organization, a service provider, and/or the like). For example, the personas may include an infrastructure support engineer persona, a supervisor persona, a market lead persona, a software development persona, a test engineer persona, a customer persona, an administrative personnel persona, and/or the like.

A persona may be associated with a set of applications, a set of tasks, a set of databases, a set of credentials, and/or the like. The application aggregation system may generate a user interface associated with the persona that enables a user assigned to the persona to access the set of application, perform the set of tasks, access the set of databases, utilize the set of credentials, and/or the like. In this way, the application aggregation system may enable the user to utilize a single user interface associated with the persona to access multiple different applications, databases, services, and/or the like and/or to perform multiple different tasks rather than utilizing multiple different user interfaces to access the multiple different applications, databases, services, and/or the like and/or to perform the multiple different tasks.

The application aggregation system may analyze the context data, the task data, and the role data to identify a set of the tasks performed by a set of the users, a set of applications accessed by the set of the users, a set of databases accessed by the set of the users, and/or the like. The application aggregation system may determine a personas for the sets of the users based on the set of tasks performed by the set of the users, the set of applications accessed by the set of the users, the set of databases accessed by the set of the users, and/or the like.

For example, the application aggregation system may determine that the set of the users utilized a set of applications to perform a set of tasks associated with maintenance events. The application aggregation system may determine that the set of applications and/or the set of tasks are associated with an infrastructure support engineer. The application aggregation system may determine an infrastructure support engineer persona for the set of the users based on the set of the users utilizing the set of applications to perform the set of tasks associated with maintenance events. The application aggregation system may assign each user, of the sets of the users, to the infrastructure support engineer person based on the application aggregation system determining the infrastructure support engineer persona for the set of the users.

In some implementations, the persona creator model includes one or more of a Levenshtein distance model, a Damerau-Levenshtein distance model, a term frequency model, an inverse document frequency model, or a term frequency-inverse document frequency model. In some implementations, the application aggregation system may train the persona creator model to determine the persona data and the assignment data. The persona creator model may be trained based on historical data relating to generating personas and assigning users to the personas. The persona creator model may be trained to determine, based on context data, task data, and role data, persona data and assignment data associated with a user, a confidence score that reflects a measure of confidence that the persona data and the assignment data are accurate for this user. In some implementations, the application aggregation system trains the persona creator model in a manner similar to that described below with respect to FIG. 2. Alternatively, and/or additionally, the application aggregation system may obtain a trained persona creator model from another device.

Figure 1E:
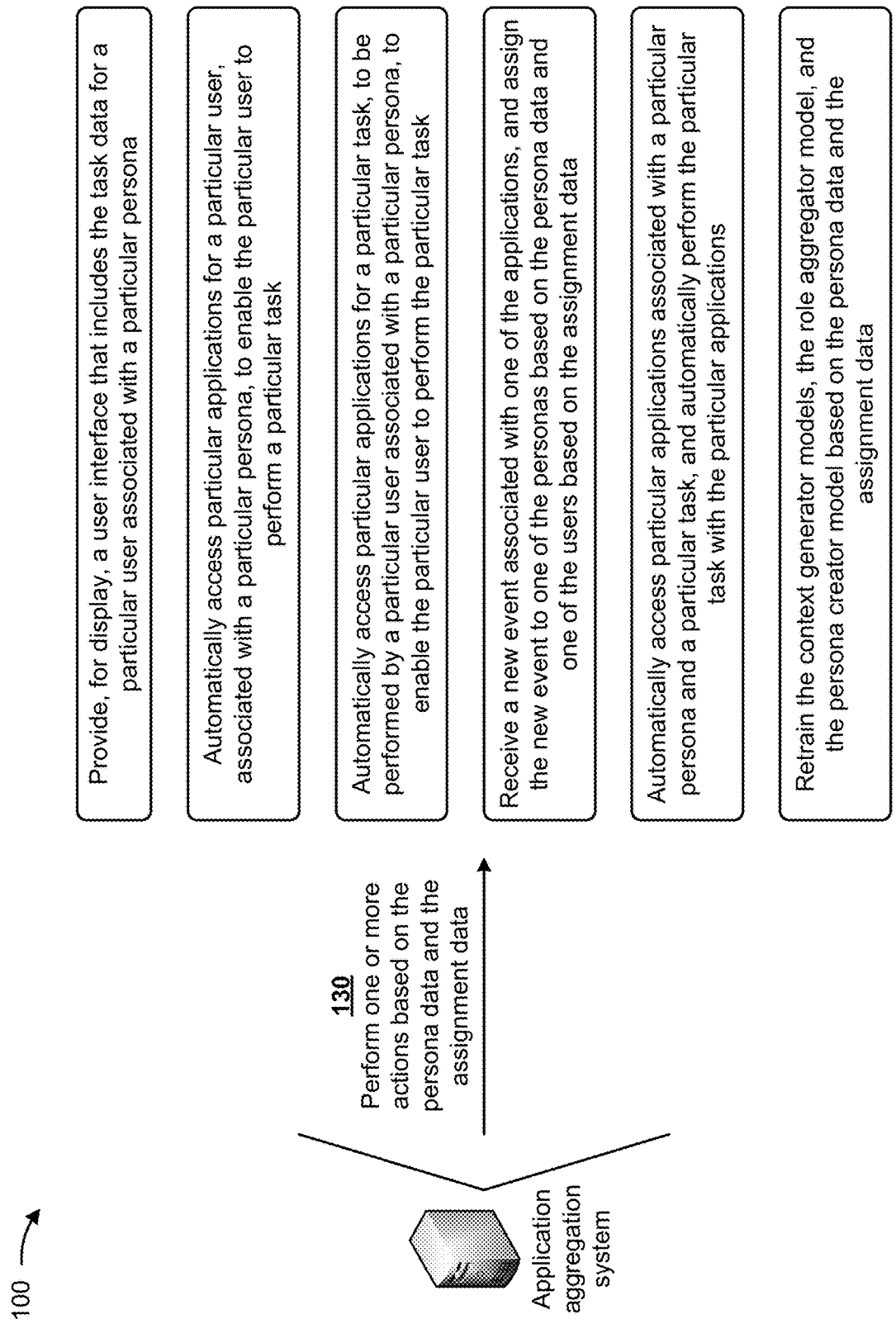

As shown in FIG. 1E, and by reference number 130, the application aggregation system performs one or more actions based on the persona data and the assignment data. In some implementations, the one or more actions include providing, for display, a user interface that includes the task data for a particular user associated with a particular persona. As an example, a user may utilize a set of credentials to access the application aggregation system. The application aggregation system may identify a user profile associated with the user based on the set of credentials. The application aggregation system may identify a persona associated with the user based on the user profile. The application aggregation system may identify a user interface associated with the persona and may provide the user interface to the user via the client device. The application aggregation system may determine task data identifying a set of tasks associated with the persona. The application aggregation system may provide the task data to the user via the user interface based on the set of tasks being associated with the persona.

In some implementations, the one or more actions include automatically accessing particular applications for a particular user, associated with a particular persona, to enable the particular user to perform a particular task and/or automatically accessing particular applications for a particular task, to be performed by a particular user associated with a particular persona, to enable the particular user to perform the particular task. For example, the application aggregation system may determine a set of credentials for accessing a particular application based on role data associated with the persona. The application aggregation system may utilize the set of credentials to access the particular application. The application aggregation system may enable the user to perform the particular task, via the user interface associated with the persona, based on the application aggregation system accessing the particular application.

In some implementations, the one or more actions include receiving a new event associated with one of the applications, and assigning the new event to one of the personas based on the persona data and one of the users based on the assignment data. The application aggregation system may receive application data from the one or more client devices and/or the one or more server devices. The application data may include information identifying a new event associated with an application. The application aggregation system may determine a persona associated with the new event based on the persona data. The application aggregation system may identify a user assigned to the persona based on the assignment data. The application aggregation system may assign the new event to the user based on the user being assigned to the persona. The application aggregation system may provide information identifying the new event to the user (e.g., via a user interface associated with the persona) based on assigning the new event to the user.

In some implementations, the one or more actions include automatically accessing particular applications associated with a particular persona and a particular task, and automatically performing the particular task with the particular applications. As an example, the application aggregation system may determine that a user accessed the application aggregation system. The application aggregation system may identify a persona associated with the user based on the assignment data. The application aggregation system may determine a task associated with the persona based on the persona data. The application aggregation system may determine an application associated with the task based on the context data and/or the task data. The application aggregation system may determine a set of credentials for accessing the application based on the role data. The application aggregation system may determine that the application aggregation system is to automatically perform the task based on user preference information input by the user and associated with the persona. The application aggregation system may utilize the set of credentials to access the application based on determining that the application aggregation system is to automatically perform the task. The application aggregation system may automatically perform the task based on access the application. In some implementations, the application aggregation system may provide, via a user interface associated with the persona, a notification to the user indicating that the application aggregation system automatically performed the task.

In some implementations, the one or more actions include retraining the context generator models, the role aggregator model, and the persona creator model based on the persona data and the assignment data. By utilizing the persona data and the assignment data to retrain the context generator models, the role aggregator model, and the persona creator model, the application aggregation system may increase a quantity of training data utilized to train the context generator models, the role aggregator model, and the persona creator model.

By increasing the quantity of training data, the application aggregation system may improve an accuracy of the context generator models, the role aggregator model, and the persona creator model. Accordingly, the application aggregation system may conserve computing resources associated with identifying, obtaining, and/or generating actual historical data to train the context generator models, the role aggregator model, and the persona creator model relative to other systems for identifying, obtaining, and/or generating historical data for training the context generator models, the role aggregator model, and the persona creator model. Further, by improving the accuracy of the context generator models, the role aggregator model, and the persona creator model, the application aggregation system may conserve computing resources associated with inaccurately determining the context data, the task data, the role data, the persona data, and the assignment data, performing a corrective action associated with the context data, the task data, the role data, the persona data, and the assignment data being inaccurately determined, and/or the like.

In this way, and in contrast to current techniques, the application aggregation system utilizes machine learning models to aggregate applications and users with events associated with the applications. Correspondingly, the application aggregation system conserves computing resources, networking resources, and/or the like that would otherwise have been wasted accessing different applications, switching between different applications, learning about different applications, managing cloud computing environments and/or legacy computing environments, and/or the like. The application aggregation system may also improve overall performance of the cloud computing environments and/or the legacy computing environments due to efficient and effective utilization of the different applications for managing the cloud computing environments and/or the legacy computing environments. Furthermore, the application aggregation system may handle thousands, millions, billions, and/or the like, of data points associated with the different applications within a period of time (e.g., daily, weekly, monthly), and thus may provide "big data" capability.

As indicated above, FIGS. 1A-1E are provided as an example. Other examples may differ from what is described with regard to FIGS. 1A-1E. The number and arrangement of devices shown in FIGS. 1A-1E are provided as an example. In practice, there may be additional devices, fewer devices, different devices, or differently arranged devices than those shown in FIGS. 1A-1E. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) shown in FIGS. 1A-1E may perform one or more functions described as being performed by another set of devices shown in FIGS. 1A-1E.

Figure 2:
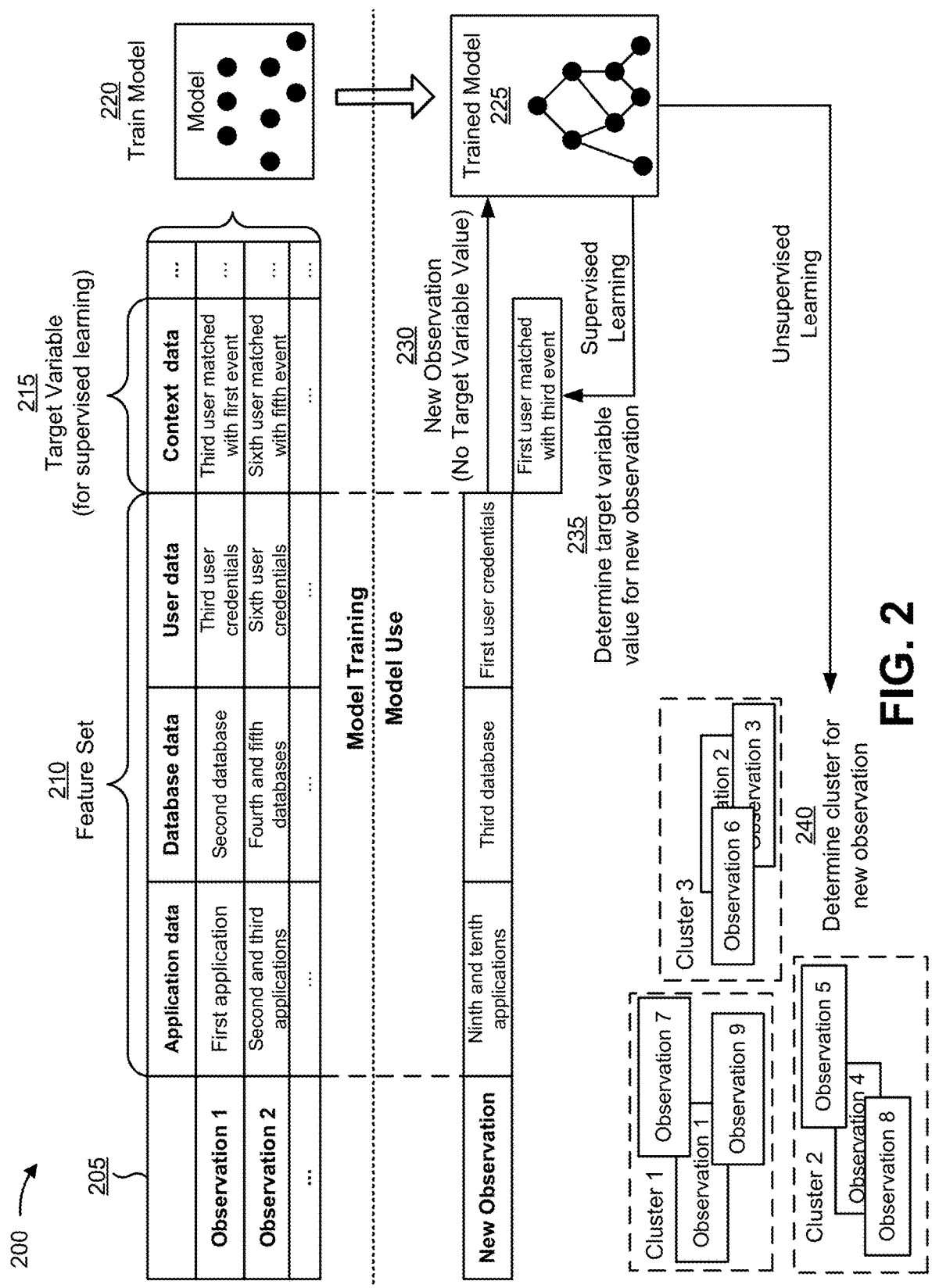
FIG. 2 is a diagram illustrating an example of training a machine learning model and applying a trained machine learning model to a new observation.

FIG. 2 is a diagram illustrating an example 200 of training and using a machine learning model in connection with determining the one or more variables for a predictive model. The machine learning model training and usage described herein may be performed using a machine learning system. The machine learning system may include or may be included in a computing device, a server, a cloud computing environment, and/or the like, such as the application aggregation system described in more detail elsewhere herein.

As shown by reference number 205, a machine learning model may be trained using a set of observations. The set of observations may be obtained from historical data, such as data gathered during one or more processes described herein. In some implementations, the machine learning system may receive the set of observations (e.g., as input) from the one or more client devices, the one or more server devices, and/or the application aggregation system, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the one or more client devices, the one or more server devices, and/or the application aggregation system. For example, the machine learning system may identify a feature set (e.g., one or more features and/or feature values) by extracting the feature set from structured data, by performing natural language processing to extract the feature set from unstructured data, by receiving input from an operator, and/or the like.

As an example, a feature set for a set of observations may include a first feature of application data (e.g., data identifying applications), a second feature of database data (e.g., data identifying databases associated with the applications, a third feature of user data (e.g., data identifying users of the application), and so on. As shown, for a first observation, the first feature may have a value of a first application, the second feature may have a value of a second database, the third feature may have a value of third user credentials, and so on. These features and feature values are provided as examples, and may differ in other examples.

As shown by reference number 215, the set of observations may be associated with a target variable (e.g., to be used to by the predictive model). The target variable may have a numeric value, may have a numeric value that falls within a range of values or has some discrete possible values, may be selectable from one of multiple options (e.g., one of multiples classes, classifications, labels, and/or the like), may have a Boolean value, and/or the like. A target variable may be associated with a value, and a value may be specific to an observation. In example 200, the target variable may include context data for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, and/or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of application data (e.g., for ninth and tenth applications), a second feature of database data (e.g., for a third database), a third feature of first user credentials, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs, information that indicates a degree of similarity between the new observation and one or more other observations, and/or the like, such as when unsupervised learning is employed.

As an example, the trained machine learning model 225 may predict that the first user is matched with a third event (e.g., associated with the ninth and tenth applications) for the target variable for the new observation, as shown by reference number 235. Based on this prediction, the machine learning system may provide a recommendation, may provide output for determination of a recommendation, may perform an automated action, may cause an automated action to be performed (e.g., by instructing another device to perform the automated action), and/or the like. The automated action may include, for example, matching the first user with the third event, as described herein.

In some implementations, the recommendation and/or the automated action associated with the new observation may be based on a target variable value having a particular label (e.g., classification, categorization, and/or the like), may be based on whether a target variable value satisfies one or more threshold (e.g., whether the target variable value is greater than a threshold, is less than a threshold, is equal to a threshold, falls within a range of threshold values, and/or the like), may be based on a cluster in which the new observation is classified, and/or the like.

In this way, the machine learning system may apply a rigorous and automated process to determining one or more variables for the predictive model. The machine learning system enables recognition and/or identification of tens, hundreds, thousands, or millions of features and/or feature values for tens, hundreds, thousands, or millions of observations, thereby increasing accuracy and consistency and reducing delay associated with determining the one or more variables for the predictive model relative to requiring computing resources to be allocated for tens, hundreds, or thousands of operators to manually determine one or more variables for the predictive model using the features or feature values.

As indicated above, FIG. 2 is provided as an example. Other examples may differ from what is described in connection with FIG. 2.

Figure 3:
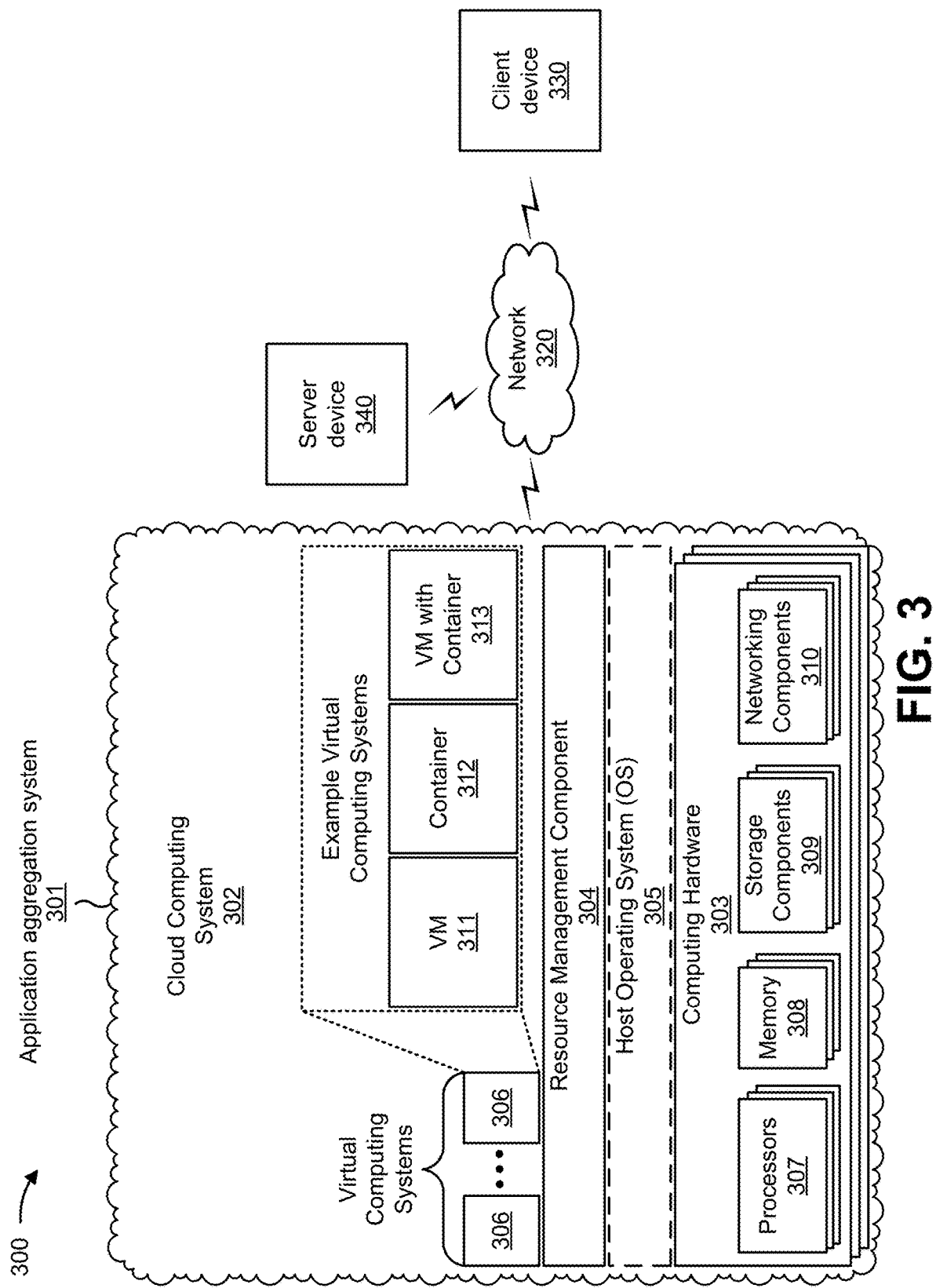
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include an application aggregation system 301, which may include one or more elements of and/or may execute within a cloud computing system 302. The cloud computing system 302 may include one or more elements 303-313, as described in more detail below. As further shown in FIG. 3, environment 300 may include a network 320, a client device 330, and/or a server device 340. Devices and/or elements of environment 300 may interconnect via wired connections and/or wireless connections.

The cloud computing system 302 includes computing hardware 303, a resource management component 304, a host operating system (OS) 305, and/or one or more virtual computing systems 306. The resource management component 304 may perform virtualization (e.g., abstraction) of computing hardware 303 to create the one or more virtual computing systems 306. Using virtualization, the resource management component 304 enables a single computing device (e.g., a computer, a server, and/or the like) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

Computing hardware 303 includes hardware and corresponding resources from one or more computing devices. For example, computing hardware 303 may include hardware from a single computing device (e.g., a single server) or from multiple computing devices (e.g., multiple servers), such as multiple computing devices in one or more data centers. As shown, computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, and/or the like) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using computing hardware 303. As shown, a virtual computing system 306 may include a virtual machine 311, a container 312, a hybrid environment 313 that includes a virtual machine and a container, and/or the like. A virtual computing system 306 may execute one or more applications using a file system that includes binary files, software libraries, and/or other resources required to execute applications on a guest operating system (e.g., within the virtual computing system 306) or the host operating system 305.

Although the application aggregation system 301 may include one or more elements 303-313 of the cloud computing system 302, may execute within the cloud computing system 302, and/or may be hosted within the cloud computing system 302, in some implementations, the application aggregation system 301 may not be cloud-based (e.g., may be implemented outside of a cloud computing system) or may be partially cloud-based. For example, the application aggregation system 301 may include one or more devices that are not part of the cloud computing system 302, such as device 400 of FIG. 4, which may include a standalone server or another type of computing device. The application aggregation system 301 may perform one or more operations and/or processes described in more detail elsewhere herein.

Network 320 includes one or more wired and/or wireless networks. For example, network 320 may include a cellular network, a public land mobile network (PLMN), a local area network (LAN), a wide area network (WAN), a private network, the Internet, and/or the like, and/or a combination of these or other types of networks. The network 320 enables communication among the devices of environment 300.

The client device 330 includes one or more devices capable of receiving, generating, storing, processing, and/or providing information, as described elsewhere herein. The client device 330 may include a communication device and/or a computing device. For example, the client device 330 may include a wireless communication device, a user equipment (UE), a mobile phone (e.g., a smart phone or a cell phone, among other examples), a laptop computer, a tablet computer, a handheld computer, a desktop computer, a gaming device, a wearable communication device (e.g., a smart wristwatch or a pair of smart eyeglasses, among other examples), an Internet of Things (IoT) device, or a similar type of device. The client device 330 may communicate with one or more other devices of environment 300, as described elsewhere herein. In some implementations, the client device 330 may use one or more tools provided by the application aggregation system 301 to facilitate development of a new product.

The server device 340 includes one or more devices capable of receiving, generating, storing, processing, providing, and/or routing information, as described elsewhere herein. The server device 340 may include a communication device and/or a computing device. For example, the server device 340 may include a server, an application server, a client server, a web server, a database server, a host server, a proxy server, a virtual server (e.g., executing on computing hardware), a server in a cloud computing system, a device that includes computing hardware used in a cloud computing environment, or a similar type of device. The server device 340 may communicate with one or more other devices of environment 300, as described elsewhere herein. In some implementations, the server device 340 may use one or more tools provided by the application aggregation system 301 to facilitate development of a new product.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
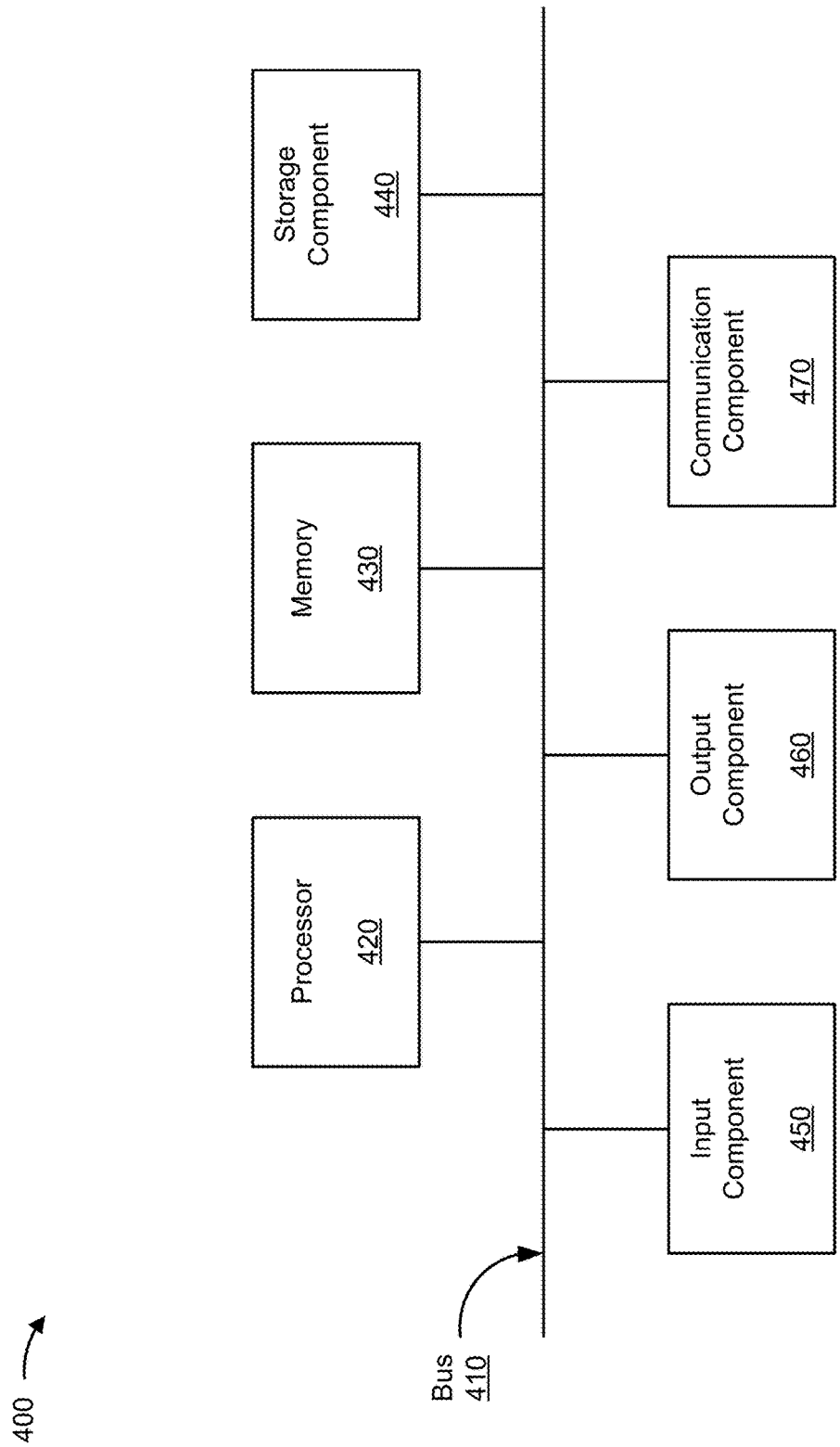
FIG. 4 is a diagram of example components of one or more devices of FIG. 3.

FIG. 4 is a diagram of example components of a device 400, which may correspond to application aggregation system 301, computing hardware 303, client device 330, and/or server device 340. In some implementations, application aggregation system 301, computing hardware 303, client device 330, and/or server device 340 may include one or more devices 400 and/or one or more components of device 400. As shown in FIG. 4, device 400 may include a bus 410, a processor 420, a memory 430, a storage component 440, an input component 450, an output component 460, and a communication component 470.

Bus 410 includes a component that enables wired and/or wireless communication among the components of device 400. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform a function. Memory 430 includes a random access memory, a read only memory, and/or another type of memory (e.g., a flash memory, a magnetic memory, and/or an optical memory).

Storage component 440 stores information and/or software related to the operation of device 400. For example, storage component 440 may include a hard disk drive, a magnetic disk drive, an optical disk drive, a solid state disk drive, a compact disc, a digital versatile disc, and/or another type of non-transitory computer-readable medium. Input component 450 enables device 400 to receive input, such as user input and/or sensed inputs. For example, input component 450 may include a touch screen, a keyboard, a keypad, a mouse, a button, a microphone, a switch, a sensor, a global positioning system component, an accelerometer, a gyroscope, an actuator, and/or the like. Output component 460 enables device 400 to provide output, such as via a display, a speaker, and/or one or more light-emitting diodes. Communication component 470 enables device 400 to communicate with other devices, such as via a wired connection and/or a wireless connection. For example, communication component 470 may include a receiver, a transmitter, a transceiver, a modem, a network interface card, an antenna, and/or the like.

Device 400 may perform one or more processes described herein. For example, a non-transitory computer-readable medium (e.g., memory 430 and/or storage component 440) may store a set of instructions (e.g., one or more instructions, code, software code, program code, and/or the like) for execution by processor 420. Processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

FIG. 5 is a flowchart of an example process 500 associated with utilizing machine learning models to aggregate applications and users with events associated with the applications. In some implementations, one or more process blocks of FIG. 5 may be performed by a device (e.g., application aggregation system 301). In some implementations, one or more process blocks of FIG. 5 may be performed by another device or a group of devices separate from or including the device, such as client device 330, server device 340, and/or the like. Additionally, or alternatively, one or more process blocks of FIG. 5 may be performed by one or more components of computing hardware 303, such as processors 307, memory 308, storage components 309, networking components 310, and/or the like; device 400, such as processor 420, memory 430, storage component 440, input component 450, output component 460, communication component 470, and/or the like; and/or the like.

As shown in FIG. 5, process 500 may include receiving application data that identifies applications utilized by users, database data that identifies databases utilized by the users and the applications, and user data that identifies the users of the application data and the database data (block 510). For example, the device may receive application data that identifies applications utilized by users, database data that identifies databases utilized by the users and the applications, and user data that identifies the users of the application data and the database data, as described above.

As further shown in FIG. 5, process 500 may include processing the application data, the database data, and the user data, with one or more context generator models, to determine context data that matches the users and events associated with the applications, and task data that identifies tasks to be performed by the users in response to the events (block 520). For example, the device may process the application data, the database data, and the user data, with one or more context generator models, to determine context data that matches the users and events associated with the applications, and task data that identifies tasks to be performed by the users in response to the events, as described above.

The one or more context generator models include one or more of a fuzzy matching model, a Levenshtein distance model, a Damerau-Levenshtein distance model, a term frequency model, or an inverse document frequency model. When processing the application data, the database data, and the user data with the one or more context generator models, the device may process the application data, the database data, and the user data, with one or more of an a priori model, a support vector model, a naive Bayes model, or a k-means model, to rank the users and match the users with the events based on rankings of the users, and may determine the task data identifying the tasks to be performed in response to the events based on prior tasks performed by the users matched with the events.

The context data may include data identifying one or more of resources associated with the events, types associated with the events, criticalities associated with the events, or frequencies associated with the events.

As further shown in FIG. 5, process 500 may include processing the application data, the database data, the user data, and the context data, with a role aggregator model, to generate role data that identifies user interfaces utilized by the users to access the applications, and credentials of the users for accessing the applications (block 530). For example, the device may process the application data, the database data, the user data, and the context data, with a role aggregator model, to generate role data that identifies user interfaces utilized by the users to access the applications, and credentials of the users for accessing the applications, as described above. When processing the application data, the database data, the user data, and the context data, with the role aggregator model, to generate the role data, the device may identify the user interfaces utilized by the users to access the applications, may identify the credentials of the users for accessing the applications, and may match the user interfaces and the credentials.

As further shown in FIG. 5, process 500 may include processing the context data, the task data, and the role data, with a persona creator model, to generate persona data that identifies personas, and assignment data that assigns each of the users to one of the personas (block 540). For example, the device may process the context data, the task data, and the role data, with a persona creator model, to generate persona data that identifies personas, and assignment data that assigns each of the users to one of the personas, as described above. The persona creator model includes one or more of a Levenshtein distance model, a Damerau-Levenshtein distance model, a term frequency model, an inverse document frequency model, or a term frequency-inverse document frequency model. The personas may include one or more of an infrastructure support engineer persona, a supervisor persona, a market lead persona, a software development persona, or a test engineer persona.

In some implementations, processing the context data, the task data, and the role data, with the persona creator model, to generate the persona data identifying the personas and the assignment data assigning each of the users to one of the personas includes analyzing the context data, the task data, and the role data to identify sets of the tasks performed by sets of the users, determining one of the personas for each of the sets of the users, and assigning each of the sets of the users to the one of the personas.

As further shown in FIG. 5, process 500 may include performing one or more actions based on the persona data and the assignment data (block 550). For example, the device may perform one or more actions based on the persona data and the assignment data, as described above.

In some implementations, performing the one or more actions includes providing, for display, a user interface that includes the task data for a particular user associated with a particular persona; automatically accessing one or more particular applications for a particular user, associated with a particular persona, to enable the particular user to perform a particular task; automatically accessing one or more particular applications for a particular task, to be performed by a particular user associated with a particular persona, to enable the particular user to perform the particular task; or retraining at least one of the one or more context generator models, the role aggregator model, or the persona creator model based on the persona data and the assignment data.

Alternatively, and/or additionally, performing the one or more actions includes receiving a new event associated with one of the applications, and assigning the new event to one of the personas based on the persona data and one of the users based on the assignment data. Performing the one or more actions may also include automatically accessing particular applications associated with a particular persona and a particular task, and automatically performing the particular task with the particular applications. Automatically accessing the particular applications associated with the particular persona and the particular task may include identifying a particular user assigned to the particular persona based on the assignment data, and utilizing particular credentials of the particular user to automatically access the particular applications.

In some implementations, the device may identify a particular event associated with another one of the applications, may assign the particular event to another one of the personas based on the persona data and to another one of the users based on the assignment data, may generate a recommendation for a particular task to be performed to resolve the particular event, and may provide the recommendation for display to the other one of the users.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, etc., depending on the context.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
    training, by a device, one or more context generator models based on:
        historical data associated with events, and
        historical data associated with classifications associated with the events;
    receiving, by the device, application data that identifies at least two different applications utilized by users, database data that identifies databases utilized by the users and the at least two different applications, and user data that identifies the users of the application data and the database data;
    processing, by the device, the application data, the database data, and the user data, with the one or more context generator models, to determine:
        context data that matches the users and the events associated with the at least two different applications, and
        task data that identifies tasks to be performed by the users in response to the events;
    training, by the device, a role aggregator model based on:
        historical data associated with user interfaces utilized by the users for accessing the at least two different applications, and
        historical data associated with credentials of the users for accessing the at least two different applications;
    processing, by the device, the application data, the database data, the user data, and the context data, with the role aggregator model, to generate role data that identifies:

the user interfaces utilized by the users to access the at least two different applications, and
credentials of the users for accessing the at least two different applications;
training, by the device, a persona creator model based on:
historical data associated with generating personas, and
historical data associated with assigning the users to the personas;
processing, by the device, the context data, the task data, and the role data, with the persona creator model, to generate:
persona data that identifies the personas, and
assignment data that assigns each of the users to one of the personas;
generating, by the device, a user interface associated with the personas,
wherein the user interface is a single user interface that enables a user, of the users, assigned to a persona, of the personas, to:
access the at least two different applications,
perform a set of tasks associated with the persona,
access a set of databases associated with the persona, and
utilize a set of credentials associated with the persona;
performing, by the device, one or more actions based on the persona data and the assignment data;
determining, by the device, a confidence score that reflects a measure of confidence that the persona data and the assignment data are accurate for the user; and
retraining, by the device, the one or more context generator models, the role aggregator model, and the persona creator model based on the persona data, the assignment data, and the confidence score; and
determining, by the device, updated persona data and updated assignment data based on retraining the one or more context generator models, the role aggregator model, and the persona creator model.

2. The method of claim 1, wherein performing the one or more actions comprises one or more of:
providing, for display, another user interface that includes the task data for a particular user associated with a particular persona;
automatically accessing one or more particular applications for a particular user, associated with a particular persona, to enable the particular user to perform a particular task; or
automatically accessing one or more particular applications for a particular task, to be performed by a particular user associated with a particular persona, to enable the particular user to perform the particular task.

3. The method of claim 1, wherein performing the one or more actions comprises:
receiving a new event associated with one of the at least two different applications; and
assigning the new event to one of the personas based on the persona data and one of the users based on the assignment data.

4. The method of claim 1, wherein performing the one or more actions comprises:
automatically accessing particular applications associated with a particular persona and a particular task; and
automatically performing the particular task with the particular applications.

5. The method of claim 4, wherein automatically accessing the particular applications associated with the particular persona and the particular task comprises:
identifying a particular user assigned to the particular persona based on the assignment data; and
utilizing particular credentials of the particular user to automatically access the particular applications.

6. The method of claim 1, wherein processing the application data, the database data, and the user data with the one or more context generator models comprises:
processing the application data, the database data, and the user data, with one or more of an a priori model, a support vector model, a naive Bayes model, or a k-means model, to rank the users and match the users with the events based on rankings of the users; and
determining the task data identifying the tasks to be performed in response to the events based on prior tasks performed by the users matched with the events.

7. The method of claim 1, wherein the one or more context generator models include one or more of:
a fuzzy matching model,
a Levenshtein distance model,
a Damerau-Levenshtein distance model,
a term frequency model, or
an inverse document frequency model.

8. A device, comprising:
one or more memories; and
one or more processors, communicatively coupled to the one or more memories, configured to:
train one or more context generator models based on:
historical data associated with events, and
historical data associated with classifications associated with the events;
receive application data identifying at least two different applications utilized by users, database data identifying databases utilized by the users and the at least two different applications, and user data identifying the users of the application data and the database data;
process the application data, the database data, and the user data, with the one or more context generator models, to determine:
context data matching the users and the events associated with the at least two different applications, and
task data identifying tasks to be performed in response to the events;
train a role aggregator model based on:
historical data associated with user interfaces utilized by the users for accessing the at least two different applications, and
historical data associated with credentials of the users for accessing the at least two different applications;
process the application data, the database data, the user data, and the context data, with the role aggregator model, to generate role data identifying:
the user interfaces utilized by the users to access the at least two different applications, and
credentials of the users for accessing the at least two different applications;
train a persona creator model based on:
historical data associated with generating personas, and
historical data associated with assigning the users to the personas;
process the context data, the task data, and the role data, with the persona creator model, to generate:
persona data identifying the personas, and assignment data assigning each of the users to one of the personas;
generate a user interface associated with the one of the personas,
   wherein the user interface is a single user interface that enables a user, of the users assigned to the one of the personas, to:
      access the at least two different applications,
      perform a set of tasks associated with the one of the personas,
      access set of databases associated with the one of the personas, and
      utilize set of credentials associated with the one of the personas;
determine a confidence score that reflects a measure of confidence that the persona data and the assignment data are accurate for the user;
retrain the one or more context generator models, the role aggregator model, and the persona creator model based on the persona data, the confidence score, and the assignment data;
determine updated persona data and updated assignment data based on retraining the one or more context generator models, the role aggregator model, and the persona creator model;
receive a new event associated with one of the at least two different applications; and
assign the new event to one of the personas based on the persona data and one of the users based on the assignment data.

9. The device of claim 8, wherein the context data includes data identifying one or more of:
resources associated with the events,
types associated with the events,
criticalities associated with the events, or
frequencies associated with the events.

10. The device of claim 8, wherein the one or more processors, when processing the application data, the database data, the user data, and the context data, with the role aggregator model, to generate the role data, are configured to:
identify the user interfaces utilized by the users to access the at least two different applications;
identify the credentials of the users for accessing the at least two different applications; and
match the user interfaces and the credentials.

11. The device of claim 8, wherein the personas include one or more of:
an infrastructure support engineer persona,
a supervisor persona,
a market lead persona,
a software development persona, or
a test engineer persona.

12. The device of claim 8, wherein the one or more processors, when processing the context data, the task data, and the role data, with the persona creator model, to generate the persona data identifying the personas and the assignment data assigning each of the users to one of the personas, are configured to:
analyze the context data, the task data, and the role data to identify sets of the tasks performed by sets of the users;
determine one of the personas for each of the sets of the users; and
assign each of the sets of the users to the one of the personas.

13. The device of claim 8, wherein the persona creator model includes one or more of:
a Levenshtein distance model,
a Damerau-Levenshtein distance model,
a term frequency model,
an inverse document frequency model, or
a term frequency-inverse document frequency model.

14. The device of claim 8, wherein the one or more processors are further configured to:
identify a particular event associated with another one of the at least two different applications;
assign the particular event to another one of the personas based on the persona data and to another one of the users based on the assignment data;
generate a recommendation for a particular task to be performed to resolve the particular event; and
provide the recommendation for display to the other one of the users.

15. A non-transitory computer-readable medium storing a set of instructions, the set of instructions comprising:
one or more instructions that, when executed by one or more processors of a device, cause the device to:
   train one or more first models based on:
      historical data associated with events, and
      historical data associated with classifications associated with the events;
   receive application data identifying applications utilized by users, database data identifying databases utilized by the users and the applications, and user data identifying the users of the application data and the database data;
   process the application data, the database data, and the user data, with the one or more first models, to determine:
      context data matching the users and events associated with the applications, and
      task data identifying tasks to be performed in response to the events;
   train a second model based on:
      historical data associated with user interfaces utilized by the users for accessing the applications, and
      historical data associated with credentials of the users for accessing the applications;
   process the application data, the database data, the user data, and the context data, with the second model, to generate role data identifying:
      the user interfaces utilized by the users to access the applications, and
      credentials of the users for accessing the applications;
   train a third model based on:
      historical data associated with generating personas, and
      historical data associated with assigning the users to the personas;
   process the context data, the task data, and the role data, with the third model, to generate:
      persona data identifying the personas, and
      assignment data assigning each of the users to one of the personas;
   generate a user interface associated with a persona of the personas,
      wherein the user interface is a single user interface that enables a user, of the users, assigned to the persona, to:
         access the applications, perform a set of tasks associated with the persona,
access a set of databases associated with the persona, and
utilize a set of credentials associated with the persona;

determine a confidence score that reflects a measure of confidence that the persona data and the assignment data are accurate for the user;

retrain the one or more first models, the second model, and the third model based on the persona data, the assignment data, and the confidence score;

determine updated persona data and updated assignment data based on retraining the one or more first models, the second model, and the third model; and perform one or more actions based on the persona data and the assignment data.

16. The non-transitory computer-readable medium of claim 15, wherein the one or more instructions, that cause the device to perform the one or more actions, cause the device to:

provide, for display, a user interface that includes the task data for a particular user associated with a particular persona;

automatically access one or more particular applications for a particular user, associated with a particular persona, to enable the particular user to perform a particular task; or automatically access one or more particular applications for a particular task, to be performed by a particular user associated with a particular persona, to enable the particular user to perform the particular task.

17. The non-transitory computer-readable medium of claim 15, wherein the one or more instructions, that cause the device to perform the one or more actions, cause the device to:

automatically access one or more particular applications associated with a particular persona and a particular task; and automatically perform the particular task with the particular applications.

18. The non-transitory computer-readable medium of claim 15, wherein the one or more instructions, that cause the device to process the application data, the database data, and the user data with the one or more first models, cause the device to:

process the application data, the database data, and the user data, with one or more of an a priori model, a support vector model, a naive Bayes model, or a k-means model, to rank the users and match the users and the events based on rankings of the users; and determine the task data identifying the tasks to be performed in response to the events based on prior tasks performed by the users matched with the events.

19. The non-transitory computer-readable medium of claim 15, wherein the one or more instructions, that cause the device to process the application data, the database data, the user data, and the context data, with the second model, to generate the role data, cause the device to:

identify the user interfaces utilized by the users to access the applications;

identify the credentials of the users for accessing the applications; and match the user interfaces and the credentials.

20. The non-transitory computer-readable medium of claim 15, wherein the one or more instructions, that cause the device to process the context data, the task data, and the role data, with the third model, to generate the persona data identifying the personas and the assignment data assigning each of the users to one of the personas, cause the device to:

analyze the context data, the task data, and the role data to identify sets of the tasks performed by sets of the users;

determine one of the personas for each of the sets of the users; and assign each of the sets of the users to the one of the personas.

* * * * *